United States Patent
Zhang

(10) Patent No.: US 7,411,918 B2
(45) Date of Patent: *Aug. 12, 2008

(54) DYNAMIC RADIO LINK ADAPTATION FOR INTERFERENCE IN CELLULAR SYSTEMS

(75) Inventor: Guodong Zhang, Farmingdale, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/584,942

(22) Filed: Oct. 23, 2006

(65) Prior Publication Data

US 2007/0036114 A1   Feb. 15, 2007

Related U.S. Application Data

(63) Continuation of application No. 11/141,215, filed on May 31, 2005, now Pat. No. 7,126,922, and a continuation of application No. 10/322,161, filed on Dec. 18, 2002, now Pat. No. 6,907,010.

(60) Provisional application No. 60/418,386, filed on Oct. 11, 2002.

(51) Int. Cl.
*H04J 1/16* (2006.01)
*H04J 3/14* (2006.01)
*H04L 1/00* (2006.01)
*H04L 12/26* (2006.01)
*H04B 7/00* (2006.01)
*H04Q 7/20* (2006.01)
*G01R 31/08* (2006.01)

(52) U.S. Cl. ............. 370/252; 370/437; 455/62; 455/63.1; 455/67.11; 455/522

(58) Field of Classification Search ............ 370/252, 370/332, 232, 437, 279, 294, 329, 389, 335, 370/465, 338, 342, 349, 441, 242, 216; 455/450, 455/509, 552, 561, 466, 62, 67.11, 522, 69, 455/101, 67.13, 424; 725/31, 100, 131, 151
See application file for complete search history.

(56) References Cited

U.S. PATENT DOCUMENTS 6,392,572 B1   5/2002   Shiu et al.

(Continued)

FOREIGN PATENT DOCUMENTS

WO   2004/034608   4/2004

*Primary Examiner*—Wing F. Chan
*Assistant Examiner*—Prenell P Jones
(74) *Attorney, Agent, or Firm*—Volpe and Koening, P.C.

(57) ABSTRACT

A method for performing dynamic link adaptation by a user equipment (UE) in a cellular system, the UE having two coded composite transport channels (CCTrCHs) in an uplink time slot begins by estimating a transmit power for a first transport format combination (TFC) and a second TFC, each TFC corresponding to one CCTrCH. The estimated transmit power for the first TFC is compared with a maximum transmit power threshold of the UE, and is blocked if the estimated transmit power exceeds the threshold. The estimated transmit power for the second TFC is compared with the threshold, and is blocked if the estimated transmit power exceeds the threshold. The combined transmit power of the first TFC and the second TFC is compared with the threshold, and one TFC is selectively blocked if the combined transmit power exceeds the threshold, the blocking being based on a predetermined rule.

6 Claims, 1 Drawing Sheet

U.S. PATENT DOCUMENTS

| | | |
|---|---|---|
| 6,510,137 B1 | 1/2003 | Belaiche |
| 6,510,146 B1 | 1/2003 | Korpela et al. |
| 6,564,067 B1 | 5/2003 | Agin |
| 6,622,024 B2 | 9/2003 | Koo et al. |
| 6,640,105 B1 | 10/2003 | Shin |
| 6,661,777 B1 | 12/2003 | Blanc et al. |
| 6,671,514 B1 | 12/2003 | Cedervall et al. |
| 6,675,016 B2 | 1/2004 | Lucidarme et al. |
| 6,725,039 B1 | 4/2004 | Parmar et al. |
| 6,747,958 B2 | 6/2004 | Vayanos et al. |
| 6,760,596 B1 * | 7/2004 | Fiorini et al. ............... 455/522 |
| 6,907,010 B2 * | 6/2005 | Zhang ....................... 370/252 |
| 7,126,922 B2 * | 10/2006 | Zhang ....................... 370/252 |
| 2002/0037749 A1 | 3/2002 | Wager |
| 2004/0266461 A1 | 12/2004 | Beckmann et al. |

\* cited by examiner

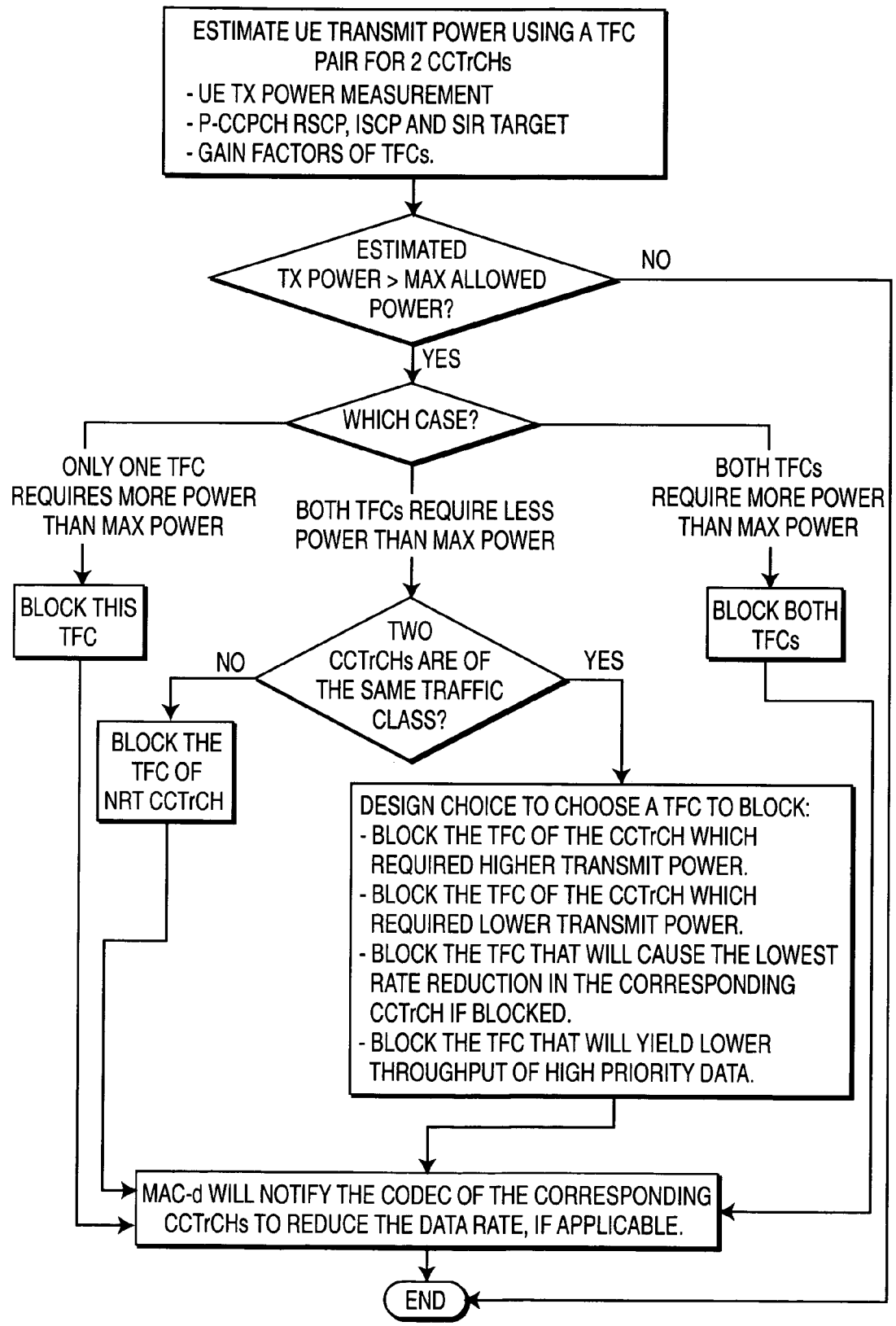

DYNAMIC RADIO LINK ADAPTATION FOR INTERFERENCE IN CELLULAR SYSTEMS

CROSS REFERENCE TO RELATED APPLICATIONS

This application is a continuation of U.S. patent application Ser. No. 11/141,215, filed May 31, 2005, now U.S. Pat. No. 7,126,922 which is a continuation of U.S. patent application Ser. No. 10/322,161, filed Dec. 18, 2002, now U.S. Pat. No. 6,907,010, issued Jun. 14, 2005, which claims the benefit of U.S. Provisional Application No. 60/418,386 filed on Oct. 11, 2002, which are incorporated by reference as if fully set forth herein.

FIELD OF INVENTION

This invention generally relates transport format combination (TFC) selection, and more particularly to a technique enabling a user equipment (UE) to make a TFC selection employing dynamic link adaptation (DLA).

BACKGROUND

The following acronyms are used in this application:

| | |
|---|---|
| CCPCH | common control physical channel |
| CCTrCH | coded composite transport channel |
| ISCP | interference signal code power |
| MAC | medium access control |
| NRT | non-real time |
| RSCP | received signal control power |
| RT | real time |
| SIR | signal to interference ratio |
| TDD | time-division duplex |
| TFC | transport format combination |
| TX | transmission |
| UE | user equipment |
| UMTS | universal mobile telecommunications system |

For UMTS-TDD systems, in an uplink time slot where the UE has only one CCTrCH, the UE TX power is the TX power of the CCTrCH, which is determined by the TFC used for this CCTrCH. As specified in the standards, when the UE estimates that a certain TFC would require more power than the maximum transmitter power, it should limit the usage of that TFC. The UE continuously evaluates which TFCs can be used for the purpose of TFC selection. The evaluation is performed using the estimated UE transmit power of a given TFC. MAC-d will notify the codec to reduce the data rate, if applicable, by sharing the information as to which TFCs can be used. This is called dynamic link adaptation (DLA).

However, in an uplink time slot where the UE has two CCTrCHs, the UE TX power is the sum of the TX power of the two CCTrCHs. That is, UE TX power is determined jointly by the TFCs of the two CCTrCHs. The current standardized dynamic link adaptation (DLA) algorithm cannot deal with this case, i.e., the UE does not know which TFCs to use or block.

It is desirable to provide a method of enabling a UE to make a decision regarding TFC selection by using dynamic link adaptation (DLA).

SUMMARY

The invention provides a method of dynamic radio link adaptation in the presence of variable interference conditions in cellular systems. The invention offers a solution to perform dynamic link adaptation properly when the UE has two CCTrCHs in an uplink time slot. The invention also provides details of the preferred implementation, and strategies and algorithms by which cellular networks can dynamically adapt a radio link according to the change of interference. In particular, it is applicable to UMTS-TDD systems. It is to be noted that this invention is applicable to UMTS-FDD, CDMA-2000 and other systems as well.

A method for performing dynamic link adaptation by a user equipment (UE) in a cellular system, the UE having two coded composite transport channels (CCTrCHs) in an uplink time slot begins by estimating a transmit power for a first transport format combination (TFC) and a second TFC, each TFC corresponding to one CCTrCH. The estimated transmit power for the first TFC is compared with a maximum transmit power threshold of the UE, and is blocked if the estimated transmit power exceeds the threshold. The estimated transmit power for the second TFC is compared with the threshold, and is blocked if the estimated transmit power exceeds the threshold. The combined transmit power of the first TFC and the second TFC is compared with the threshold, and one TFC is selectively blocked if the combined transmit power exceeds the threshold, the blocking being based on a predetermined rule.

BRIEF DESCRIPTION OF THE DRAWING

A more detailed understanding of the invention may be had from the following description of a preferred embodiment, given by way of example and to be understood in conjunction with the accompanying drawing wherein:

FIG. 1 is a flow diagram of the process steps for a preferred embodiment of the present invention.

DETAILED DESCRIPTION OF THE PREFERRED EMBODIMENT

An implementation of an exemplary interpolator algorithm for dynamic link adaptation for CDMA cellular systems is set forth below. The exemplary dynamic link adaptation algorithm takes into account that the UE has two CCTrCHs in an uplink time slot, and includes the following:

1) The combination of a TFC used by the first CCTrCH and a TFC used by the second CCTrCH is defined as the TFC pair of the UE that has two CCTrCHs in one time slot. When the UE (physical layer) estimates that a certain TFC pair would require more power than the maximum transmitter power, the usage of that TFC pair is limited.

2) The UE will decide as to which TFCs can be used for each CCTrCH based on the following:
  a. The traffic class (RT or NRT) of the CCTrCH,
  b. The required transmit power for a TFC of a CCTrCH,
  c. Physical resource allocation information, and
  d. Priority of the logical channel.

The following is an example of the interpolator algorithm. A UE transmit power estimation will be made using the result of uplink power control (either the UE transmitted power measured over the last measurement period or the new TX power based on updated P-CCPCH RSCP, ISCP or SIR target) and the gain factors of the corresponding TFC.

When the UE estimates that a certain TFC pair would require more power than the maximum transmitter power, it will check the required transmit power of each TFC of the corresponding CCTrCH in the TFC pair. The UE will process the TFC pair depending on the transmit power and traffic class.

If only the TFC of one CCTrCH requires more power than the maximum transmitter power, then this TFC will be blocked.

If the TFCs of both CCTrCHs require more power than the maximum transmitter power, then both TFCs will be blocked.

If TFCs of both CCTrCHs require less power than the maximum transmitter power but the sum of them requires more than the maximum transmitter power, the UE will choose to block one TFC based on traffic class.

If one CCTrCH is real-time (RT) and the other CCTrCH is non-real-time (NRT), the UE will block the TFC of NRT CCTrCH.

If both CCTrCHs are RT or NRT, the UE can choose to block a TFC based on the transmit power required by the TFC or physical resource allocation information. It is a design choice. The design choice includes the following alternatives:

Block the TFC of the CCTrCH requiring higher transmit power.

Block the TFC of the CCTrCH requiring lower transmit power.

Block the TFC that will cause the lowest rate reduction in the corresponding CCTrCH if blocked. This is determined by knowing the physical resource allocation of the CCTrCHs.

Block the TFC that will yield lower throughput of high priority data.

MAC-d will notify the codec of the corresponding CCTrCH(s) to reduce the data rate, if applicable, by sharing the information as to which TFCs can be used for each CCTrCH.

FIG. 1 illustrates the steps described above for a preferred embodiment of the process of the invention, and starts at the step of "estimating UE transmit power using a TFC pair for two CCTrCHs". After stringing through the intermediate steps shown, the process of the algorithm ends in "MAC-d notifying the codec of the corresponding CCTrCHs to reduce the data rate, if applicable".

While the foregoing description makes reference to UMTS-TDD systems as an example, it is to be noted that the invention is applicable to FDD and other systems as well. Modifications, which would be needed to render the inventive method suitable for UMTS-FDD, CDMA-2000, and other systems, are considered to be within the purview of the present invention.

What is claimed is:

1. A method for performing dynamic link adaptation by a user equipment (UE) having two coded composite transport channels (CCTrCHs) in an uplink time slot, the method comprising:

estimating a transmit power for a first transport format combination (TFC) and a second TFC, each TFC corresponding to one CCTrCH;

comparing the estimated transmit power for the first TFC with a maximum transmit power threshold of the UE;

blocking the first TFC if the estimated transmit power for the first TFC exceeds the threshold;

comparing the estimated transmit power for the second TFC with the threshold;

blocking the second TFC if the estimated transmit power for the second TFC exceeds the threshold;

comparing the combined transmit power of the first TFC and the second TFC with the threshold; and selectively blocking one TFC if the combined transmit power exceeds the threshold, the blocking being based on a predetermined rule.

2. The method according to claim 1, wherein the predetermined rule includes determining the traffic class of each CCTrCH; and blocking the TFC for a CCTrCH if the CCTrCH is in a non-real time traffic class.

3. The method according to claim 1, wherein the predetermined rule includes blocking the TFC for the CCTrCH requiring a higher transmit power.

4. The method according to claim 1, wherein the predetermined rule includes blocking the TFC for the CCTrCH requiring a lower transmit power.

5. The method according to claim 1, wherein the predetermined rule includes determining a physical resource allocation for each CCTrCH; and blocking the TFC for the CCTrCH that will cause the lowest rate reduction in the CCTrCH if blocked.

6. The method according to claim 1, wherein the predetermined rule includes blocking the TFC that will yield a lower throughput of high priority data.

* * * * *